Aug. 13, 1929.  W. C. KINCAID  1,724,800
AUTOMATIC TURNTABLE
Original Filed Nov. 22, 1927  2 Sheets-Sheet 1
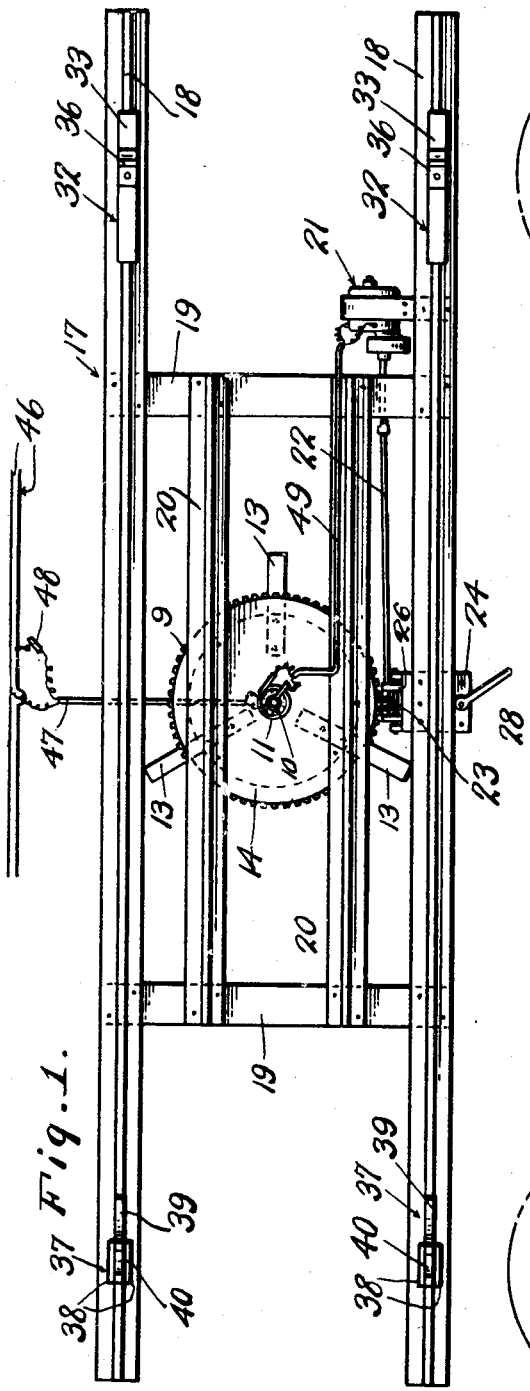
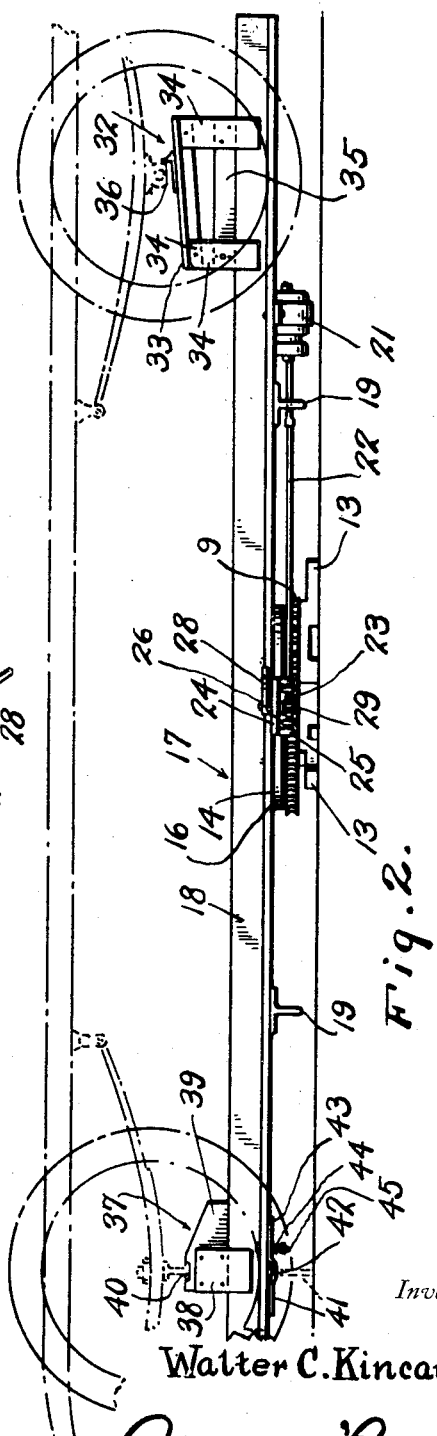
Inventor
Walter C. Kincaid
By *Clarence A. O'Brien*
Attorney Aug. 13, 1929.   W. C. KINCAID   1,724,800
AUTOMATIC TURNTABLE
Original Filed Nov. 22, 1927   2 Sheets-Sheet 2
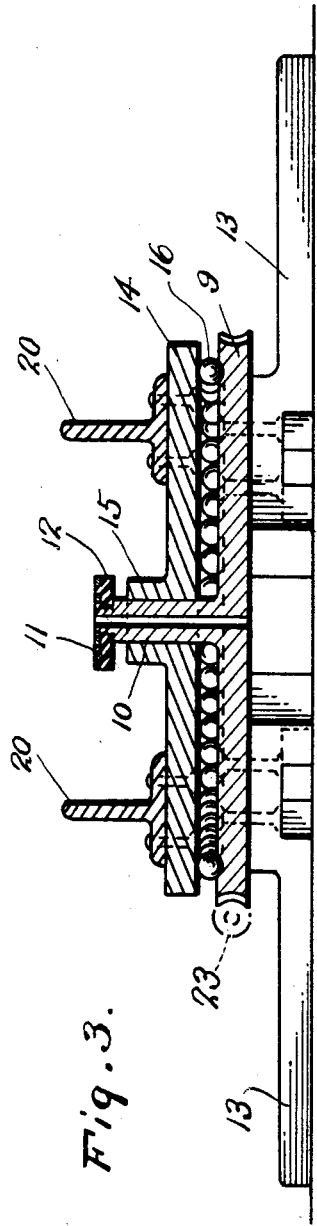
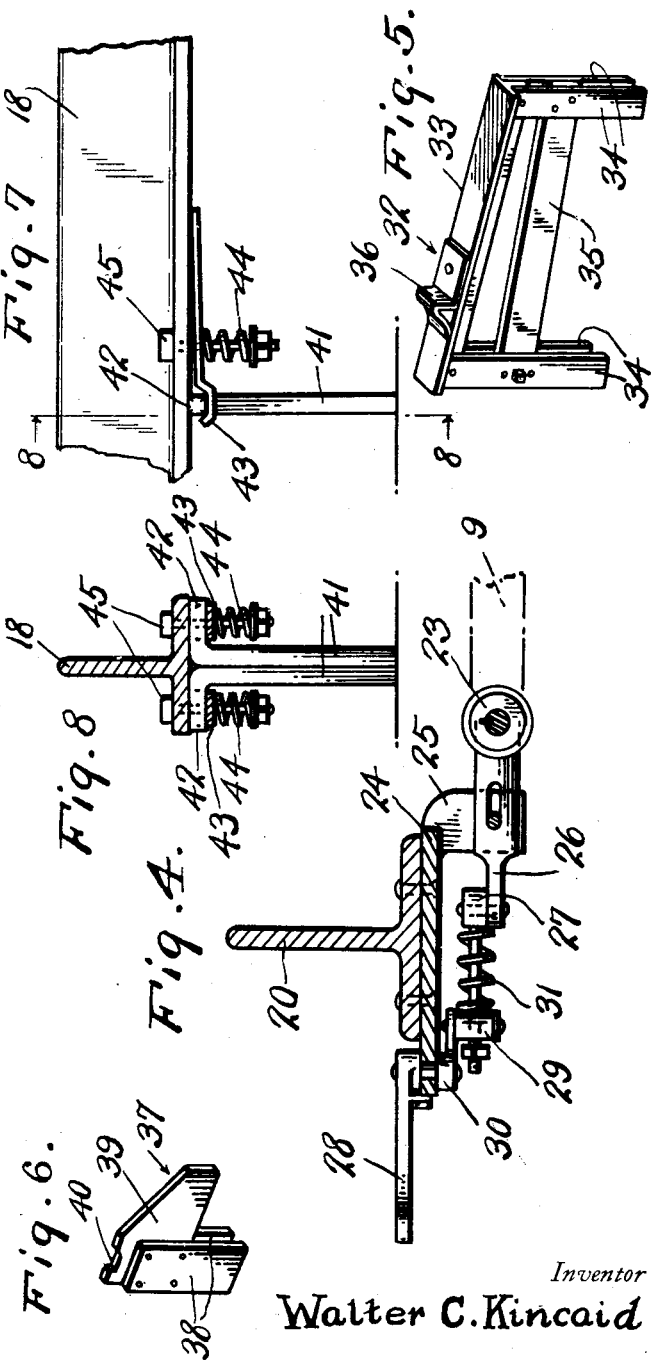
Inventor
Walter C. Kincaid
By Clarence A. O'Brien
Attorney Patented Aug. 13, 1929.

1,724,800

UNITED STATES PATENT OFFICE.

WALTER C. KINCAID, OF CHAMPAIGN, ILLINOIS.

AUTOMATIC TURNTABLE.

Application filed November 22, 1927, Serial No. 235,012. Renewed June 22, 1929.

The present invention relates to an especially constructed turn table particularly, although not necessarily, adapted for supporting an automobile to permit the same to be rotated throughout a complete revolution, thus providing a device particularly adapted for display purposes, but capable of use in warehouses, garages, paint and repair rooms, and similar establishments where it is desired to turn the automobile from time to time.

Briefly, the invention has reference to a structure of this class which embodies a table in the form of a rotary frame and a supporting and rotating base therefor.

The apparatus is characterized by a framework table composed of sturdy metal rails associated in such a way as to permit the automobile to be run over the top of them and to be jacked up on the rails by special supports to permit the wheels to clear the supporting surface.

The principal feature of this part of the invention is, sufficiency of size and proportion to accommodate vehicles having different types and sizes of wheel bases, as well as an arrangement of details such as insures proper balancing of the vehicle when elevated and supported thereon.

An equally important feature of the invention is the supporting base which embodies a uniform arrangement of supporting feet, an electric motor drive, a freely rotatable table supporting plate, and an arrangement for accommodating electricity conductors.

A further feature, is a novel worm drive shifting device characterized by features of simplicity, efficiency and dependability.

Another feature is based upon the use of novel chairs for supporting the rear axle housing.

A further feature is predicated upon use of equally efficient perches for cooperation with the front axle.

Other features and advantages of the invention will become more readily apparent from the following description and drawings.

In the drawings:—

Figure 1 is a top plan view of the complete apparatus.

Fig. 2 is a side elevation of the same.

Fig. 3 is an enlarged detail and sectional elevational view of the supporting base bearing and drive.

Fig. 4 is a detail view of the worm shift.

Fig. 5 is a perspective view of the rear axle housing chair.

Fig. 6 is a perspective view of the front axle perch.

Fig. 7 is an enlarged fragmentary side view of a removable rail prop.

Fig. 8 is a section, taken on the line 8—8 of Fig. 7.

Attention is first directed to Fig. 3 wherein a supporting base bearing structure is illustrated in detail. This comprises a stationary bottom plate having its periphery formed into a ring gear. This plate is provided with a central upstanding cylindrical guide 10 having a vertical bore extending therethrough. On the upper end of this, is a metallic contact disk 11 and a fiber washer 12.

This plate is provided with circumferentially supporting feet 13 rigidly fastened thereto and radiating outwardly therefrom. Supported above the plate 9 is a relatively rotatable plate 14 having an upstanding central collar 15 surrounding the guide 10. In order to insure free rotation anti-friction balls 16 are interposed between the plates and run in suitable annular runways.

The next part of importance is the turntable which is generally designated by the reference character 17. This comprises a pair of spaced parallel longitudinal rails 18 in the form of I-beams with the upper flanges removed. Connected to the intermediate portions of these beams and extending at right angles thereto are downturned I-beams 19 forming cross braces. These cross braces 19 support additional rails 20 suitably connected thereto and which are in turn rigidly fastened to the upper side of the rotary plate 14 as shown in Fig. 3.

As before stated, the parts of this table are properly equalized to insure proper balancing of the machine when supported thereon. In addition, the longitudinal rails 18 are made of a length to accommodate different sizes of wheel bases, and they are also spaced apart a distance to permit the wheels on a machine to readily straddle the same.

Mounted in any suitable way on one of the rails is an appropriate electric motor 21 serving to drive an operating rod 22. The operating rod is provided with a worm 23, the threads of which are in mesh with the teeth of the aforesaid ring gear in the manner shown. The operating rod is connected with the motor through a universal joint to permit the worm to be moved into and out of mesh with the ring gear.

Means for producing this movement is represented in Fig. 4 and comprises a plate 24 fastened to the base flange of the rail 20. The plate carries a pendent 25 on which a link 26 is slidably mounted. The link is connected with the worm in any appropriate manner. In fact, I may employ two of these slides or links to insure more positive action. Connected to the shank of the link is a thrust member 27 which has operating connection with the control lever 28 through the medium of the parts 29 and 30. If desired, a spring 31 may be employed for holding these parts in a set position. Also suitable retaining means for the lever 28 may be provided. Broadly, this device may be referred to as a worm shift.

Attention is now directed to Fig. 5, wherein will be seen that the reference character 32 designates generally one of the rear axle supporting chairs. This comprises a flat top bar 33 having spaced pairs of legs 34 at the opposite ends, adapted to straddle the vertical portion of the rail 18. The short legs are pivoted at their upper ends while the long legs are rigid. A brace 35 is rigidly fastened to the short legs and adjustably connected to the long legs. In addition, a metal clip or bracket 36 is fastened to the top bar 33 and constructed to provide a shoulder or rest to abut the rear axle housing.

In this connection it will be noticed that the forward end of the chair is lower than the opposite end in order that the chair may be readily slid beneath the axle. In so doing, the bottoms of the legs 34 slide along on the base flange of the rail.

In Fig. 6, the reference character 37 designates generally one of the front perches. This comprises spaced legs 38 to straddle the vertical flange of the rail as shown in the drawings, and an arm 39. The rear and upper edge of the arm is beveled to facilitate placement of the perches. In addition, a notch 40 is formed to receive the front axle as shown in dotted lines in Fig. 2.

Directing attention to Figs. 7 and 8, it will be noticed that bracing means may be employed for disposition beneath the end portions of the rails 18 when the turntable is stationary. The means comprises a pair of L-shaped props 41, the outwardly extending ends 42 of which are disposed in seats formed in the free end portions of clamping plates or strips 43. These strips are held in place by the springs 44 on the bolts 45.

The gist of the invention is directed to a structure of the class described embodying a turn table composed of properly equalized and braced parts for accommodation of machines of different makes, this being carried by the supporting base and capable of being turned by hand, but preferably turned by means of an electric motor. When a motor is used, supply wires 46 (see Fig. 1), are provided and a conductor 47 is connected with each. A suitable switch 48 is provided.

The conductor 47 extends up through the bore in the aforesaid guide 10, (see Fig. 3), and it has electrical connection with the contact disks 11 in any suitable way. Brushes cooperate here for conveying the current to a complemental conductor 49 which leads to and has electrical connection with the motor 21.

In conclusion I desire to emphasize particularly the portability of the invention, and to express the thought that the invention does not require any floor attachments or any special preparation of a floor of any kind. It can be set in any part of the store or warehouse. It is entirely self-contained, requiring no changes or additions to any part of the structure in which it is used, and having within itself the motive power used for rotating it.

It is compact, and so arranged that when an automobile is mounted on it, it is near the floor, serving the double purpose of concealing, largely, the turntable mechanism, and putting the automobile in the best position to be displayed or worked upon.

It is thought that by considering the description in connection with the drawings, a clear understanding of the construction and operation of the invention will be had. Therefore, a more lengthy description is thought unnecessary.

Minor changes coming within the scope of the invention claimed having reference to variations in shape, size, proportion, and rearrangement, may be resorted to within the scope of the invention of the adjoined claims.

Having thus described my invention, what I claim as new is:—

1. In a motor vehicle turn table of the class described, a supporting base and bearing comprising a stationary bottom plate and a top plate mounted for rotation thereon, a table proper fixedly fastened to said top plate and constructed to accommodate and support the wheel base of a motor vehicle, together with individual supporting devices movably mounted on said table and adapted to engage the front and rear axles of the vehicle.

2. In a vehicle turn table of the class described, a stationary base plate, a rotary top plate mounted for rotation thereon, a table forming frame rigidly secured to said rotary plate and embodying spaced parallel longitudinal supporting rails adapted to be straddled by the vehicle, and individual elevating and supporting devices removably mounted on said rail for engagement with the vehicle axles to elevate the vehicle sufficiently to cause the wheels to clear the supporting surface.

3. In a vehicle turn table of the class described, a stationary base plate, a rotary top plate mounted for rotation thereon, a table forming frame rigidly secured to said rotary plate and embodying spaced parallel longitudinal supporting rails adapted to be straddled by the vehicle, and individual elevating and supporting devices removably mounted on said rail for engagement with the vehicle axles to elevate the vehicle sufficiently to cause the wheels to clear the supporting surface, together with a power drive mounted on said table frame and cooperable with said base plate.

4. In a structure of the class described, a stationary base plate, supporting feet radiating therefrom, said plate having an upstanding tubular guide, a rotary plate having a central collar surrounding said guide, anti-friction balls interposed between said plates, a vehicle supporting frame rigidly fastened to the rotary plate, said stationary plate being provided a ring gear, an electric motor carried by said frame, a worm drive associated with said ring gear and motor, and a worm shift carried by said frame and cooperable with said worm.

5. In a turn table structure of the class described, a rear axle chair adapted to be slidably mounted on a supporting rail, said chair comprising supporting legs, a connecting member therebetween, and an abutment bracket on said member.

6. In a structure of the class described, a front axle perch comprising a plate provided with an axle recess, and a pair of supporting legs fastened to opposite sides of said plate and adapted for slidable movement on a supporting rail.

7. In a portable turning table, a rotary bearing, a frame supported by the bearing, a support upon which a motor vehicle may be driven or mounted, and which may be turned or rotated in either direction by manual or mechanical power, constructed to a self-contained unit having a loose contact at the surface level of the floor or driveway upon which it rests.

In testimony whereof I affix my signature.

WALTER C. KINCAID.